Sept. 22, 1936.  C. C. MARTIN  2,055,256
BANANA KNIFE
Filed April 1, 1935
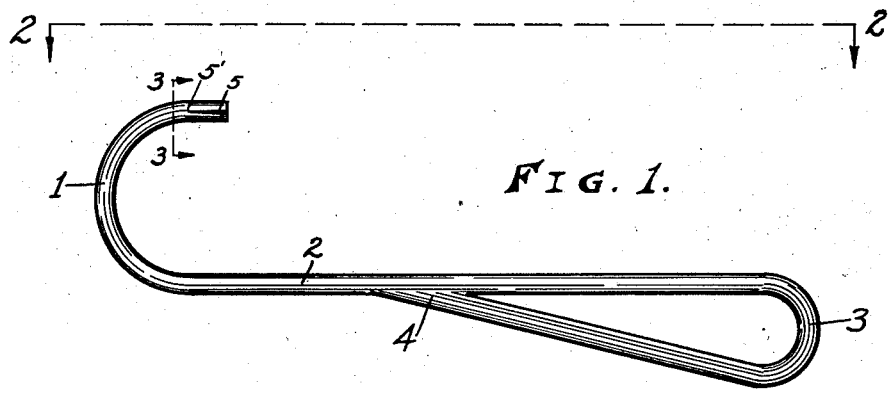
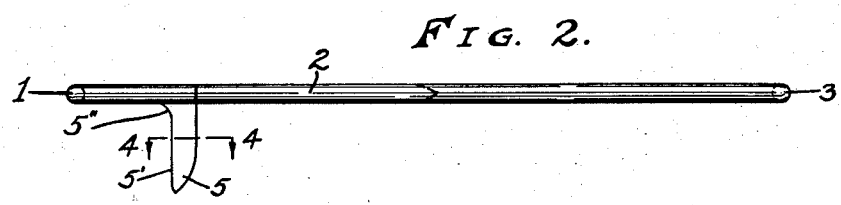
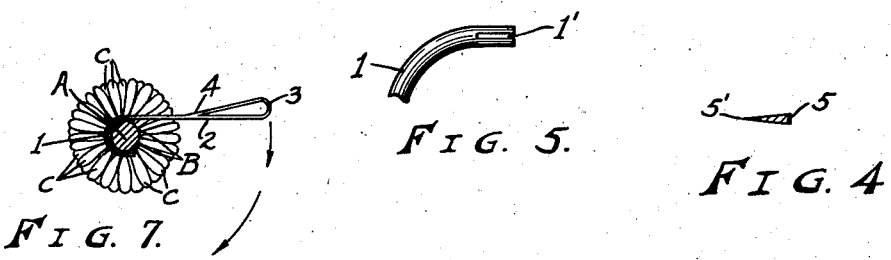
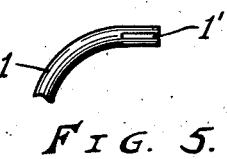
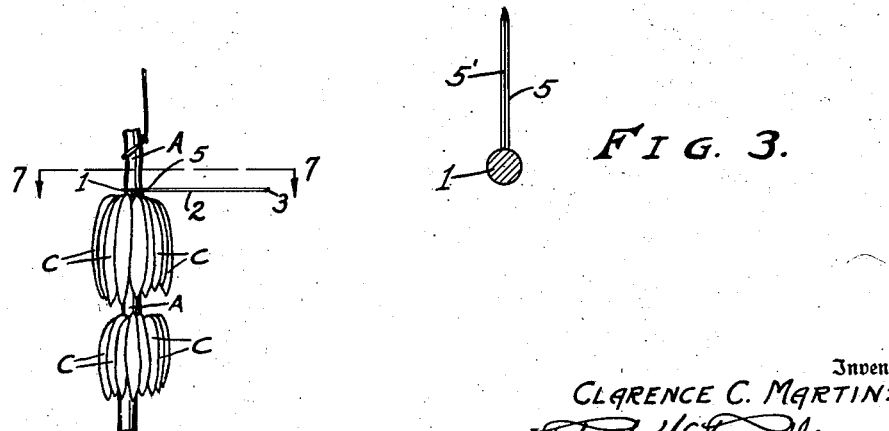
Inventor;
CLARENCE C. MARTIN:
By Robert W. Randle
and Donald E. Windle
Attorneys.

Patented Sept. 22, 1936

2,055,256

UNITED STATES PATENT OFFICE 2,055,256

BANANA KNIFE

Clarence C. Martin, Portland, Ind.

Application April 1, 1935, Serial No. 14,099

4 Claims. (Cl. 30—9)

One of the principal objects of my invention is the provision of a knife which is to be used to sever bananas from their stalk, either singly or in bunches or hands.

Another object of my invention is the provision of a knife which is simply constructed, which may be cheaply manufactured, and which is highly efficient in its operation.

Other objects and advantages of my invention will suggest themselves in the course of the following description, and that which is new will be correlated in the appended claims.

The most satisfactory manner of carrying out the principles of my invention in a practical, economical, comprehensive and efficient manner is shown in the accompanying drawing, in which;

Figure 1 is a bottom side elevation of my knife.

Figure 2 is a side elevation of the same, taken from line 2—2 of Figure 1.

Figure 3 is a detail section taken on line 3—3 of Figure 1.

Figure 4 is a detail section taken on line 4—4 of Figure 2.

Figure 5 is a detail view of the end of the curved portion showing the channeled slot formed therein.

Figure 6 is a pictorial illustration showing my knife as being used to cut bananas from the stalk.

Figure 7 is a detail section taken on line 7—7 of Figure 6.

Similar indices designate like parts throughout the several views.

In order that the construction, the operation, and the advantages of my invention may be more fully understood and appreciated, I will now take up a detailed description thereof, in which I will set forth the same as fully and as comprehensively as I may.

In the drawing, the numeral 1 designates the forward semicircular-shaped hook portion of my knife. The handle portion of my knife is formed by the portions 2, 3, and 4. 2 designates the shank or rearward extension of the forward portion, the same extending rearwardly and is bent to form the loop portion 3, after which the forwardly extending end portion 4 is rigidly secured to the shank by welding or by other well known means.

A channeled slot 1', shown in Figure 5, is formed in the end portion of the semicircular-shaped portion 1, and into which the blade member 5 is rigidly secured, the same extending at substantially right angles to the portion 1. The forward edge 5' of the blade 5 is sharpened to a knife-like edge. Near the juncture of the portion 1 and the blade member 5, the forward edge 5' is formed concave in contour, the same being designated as 5''.

The operation, or utilization, of my knife is substantially as follows;

The forward hook portion 1 of the knife is hooked around the stalk A, as shown in Figure 7, after which the knife is rotated around the stalk, as indicated by the arrows, by means of the handle portion, and the peduncles B are severed by the blade member 5, allowing the bananas C to be taken from the stalk.

I desire that it be understood that minor changes may be made in the several details, and in the arrangement of the parts herein shown and described, without departing from the spirit of my invention or sacrificing any of the advantages thereof which are new and useful, and which involve invention.

Having now fully shown and described my invention, what I claim and desire to secure by Letters Patent of the United States, is:

1. A knife comprising a rear portion forming a handle, a forwardly extending shank portion, and a blade member, said forwardly extending portion forming substantially a semicircle with the projecting end thereof being rearwardly disposed with relation to the shank portion, and said blade member being rigidly secured to the rearwardly disposed end portion and extending downwardly and at a right angle to the plane of the same.

2. A knife adapted to be manually rotated about an object, said knife comprising a length of rod, a handle formed at the rear end thereof forming a loop with the free end of the loop secured to a forwardly extending portion of said rod, a hook formed by the forward end portion of said rod with the free end of the hook extending rearwardly with relation to the major portion of said rod, a downwardly extending blade member rigidly secured to the end of said hook portion and extending at right angles thereto with a sharpened edge thereof being forwardly disposed with relation to said handle and said hook.

3. A knife comprised of a single length of metal rod having a handle formed at the rear portion thereof with the forward portion of said rod being formed substantially semicircular in shape, said forward portion having its free end directed in a rearward direction and having a channeled slot formed vertically therethrough, a blade member rigidly secured in the channeled slot and extending downwardly therefrom with said blade extending at a right angle to the plane of the handle and the forward portion and with the forward edge of the blade being sharpened, all substantially as shown and described.

4. A banana knife comprising a length of round metal rod having the rear portion thereof turned forwardly with the end thereof being welded to the central portion of the rod and forming a handle thereby, a substantial semicircle formed by the forward portion of the rod, the same having its end portion terminating in a rearward direction, a slot formed vertically through the rearwardly extending forward end portion, a blade member secured in said slot and extending downwardly therefrom with relation to the plane of the forward and rear portions of the handle member, said blade member having its forward edge sharpened and forming a cutting edge thereby with the contour of the upper portion of the forward edge being concave with relation to the lower portion of the sharpened edge.

CLARENCE C. MARTIN.